June 1, 1926.
E. I. CLAPP
1,586,732
ABSOLUTE ALCOHOL PROCESS
Filed Nov. 18, 1924
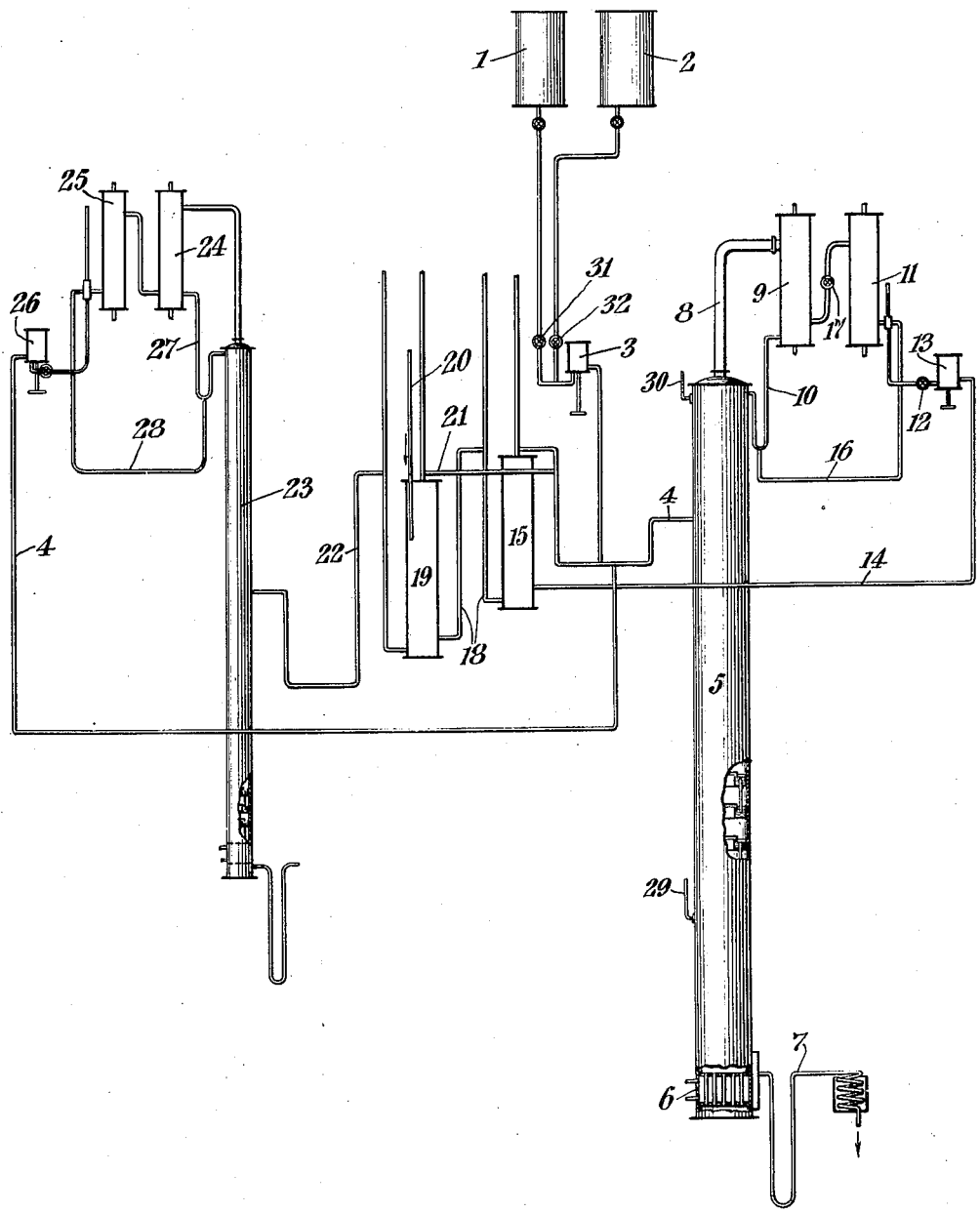
Inventor
Elwood I. Clapp
By Prindle, Wright, Neal & Bean
Attorneys Patented June 1, 1926.

1,586,732

UNITED STATES PATENT OFFICE.

ELWOOD I. CLAPP, OF BALTIMORE, MARYLAND, ASSIGNOR TO U. S. INDUSTRIAL ALCOHOL CO., A CORPORATION OF WEST VIRGINIA.

ABSOLUTE-ALCOHOL PROCESS.

Application filed November 18, 1924. Serial No. 750,519.

This invention relates to an absolute alcohol process, and more particularly to one wherein alcohol is dehydrated completely by distilling therefrom constant boiling mixtures containing the water present in the original alcohol.

The invention has as an object a process of dehydrating alcohol to remove substantially all of the water therefrom by means of a distillation process, in which benzol or its equivalent is employed to form constant boiling mixtures with the water and alcohol, in order to separate the water from the alcohol which remains in the distilling column. It is also an object of the invention to regulate the ratio of the benzol or its equivalent to the water, so that the regulation, operation, and control of the dehydration process will be made very simple, and so that the product produced by such process will be uniform and of high quality. Other advantages and objects of the invention will be more fully set forth in the following specification, in which a preferred embodiment of the invention is fully described.

The said preferred embodiment of an apparatus for use with my invention is illustrated in the accompanying drawings which form part of the specification, and in which—

The figure shows, in diagrammatic form, an apparatus for carrying out the process of dehydration with the aid of a third liquid such as benzol.

For the purpose of illustration, it will be assumed that commercial ethyl alcohol containing 95% by volume pure alcohol is to be dehydrated, although alcohol of greater or less strength may be used for this purpose, if desired. The alcohol is supplied from a suitable tank 1, and the benzol sufficient to charge the apparatus, is supplied from a tank 2. The liquids are mixed prior to entering a flow box 3, and thence pass through a pipe 4 into a dehydrating column 5. The latter is heated at its lower end by means of a suitable steam heater 6, and the mixture in the column is rectified until the ingredients are properly distributed throughout the column. When equilibrium conditions are obtained, a constant boiling ternary mixture comprising approximately by weight 18.5% ethyl alcohol, 74.1% benzol, and 7.4% water will appear at the top of the column, and a binary mixture of alcohol and benzol in the middle of the column, while absolute ethyl alcohol will be found at the bottom of the column, and during the progress of this operation this ethyl alcohol will be withdrawn, at approximately the rate at which it is produced, through a pipe 7 to a suitable storage vessel.

The distillation in the column produces on the top plate, where the temperature is maintained at approximately 65° C., the constant boiling ternary mixture of ethyl alcohol, benzol, and water, or as near this theoretical amount as the design of the apparatus will permit. This mixture passes through a vapor pipe 8 into a dephlegmator 9, which condenses part of the vapors and returns the condensate as reflux through a pipe 10 to the top plate of the column. The remaining vapor is now condensed in a condenser 11, which also cools the condensed liquid. The latter is drawn off through a valve 12 and flow box 13, and passes through a conduit 14 to a separator 15. Any surplus held back by the valve 12 passes through a pipe 16 to the top plate of the column 5. The condenser 11 is vented to the air. The water supplied to the dephlegmator and condenser is regulated in any suitable way and the steam that enters the heater 6 is preferably regulated in any suitable manner to maintain a definite pressure therein.

Upon entering the separator 15, the liquid separates into two layers, the top layer consisting chiefly of benzol and the bottom layer consisting chiefly of aqueous alcohol. The approximate proportions in these two layers are as follows: The benzol layer comprises by weight 85.6% benzol, 11.6% alcohol and 2.8% water. The lower layer comprises by weight 8.1% benzol, 51.3% alcohol and 40.6% water. The upper benzol layer flows back into the column 5 through the pipe 4, which also serves, as previously stated, as the entrance pipe for the mixture of 95% alcohol and benzol. The bottom layer makes its exit through a pipe 18, which acts as a level regulating device, and thence passes into a scrubber 19 wherein it is washed by means of water entering through a pipe 20. As a result the remaining benzol is separated from the mixture and flows back from the top of the scrubber by means of a pipe 21 to the aforesaid pipe 4, thus reentering the distilling column 5. Substantially all of the benzol used thus is returned to be used again in the distilling process in the column 5. The washing in this scrubber 19 produces a wash water containing by volume approximately 0.1% benzol, 25% alcohol, and 74.9% water. The aqueous alcohol thus produced is removed through a pipe 22 which delivers it to an alcohol rectification column 23, wherein the alcohol is rectified in the usual manner to recover 95% ethyl alcohol, the water being discharged at the bottom of the column. The vapors from the column pass through a dephlegmator 24 and a condenser 25 and the condensate issues from the same by a flow box 26. From this flow box the condensed liquid may be passed back again through the pipe 4 into the first distilling column 5. As in the case of the column 5, suitable pipes 27 and 28 are provided for supplying the top plate of the column with liquid.

A suitable thermometer 29 is provided as shown on the column 5, to indicate the temperature in the column at the point where there is alcohol containing a slight trace of benzol and where the temperature is normally 79° C. If the temperature there increases above that point, this indicates a loss of benzol by leakage, and loss due to use of wash water, etc., and some further benzol should then be added from the tank 2. As already pointed out, the alcohol reaches the bottom of the column in a pure form while the water issues from the top in the form of a ternary constant boiling mixture, which is suitably treated as described, to remove the water and return the benzol and alcohol to the column. The number of plates required for the rectification will vary with the design of the apparatus and will depend principally upon the efficiency of each plate.

It should be noted that in this embodiment the feed of 95% alcohol and benzol from the tanks 1 and 2 may be mixed with benzol and alcohol obtained from the constant boiling mixture, prior to their admission to the distilling column 5. The number of plates above the pipe 4 should of course be sufficient to produce a constant boiling ternary mixture at the top plate, and the temperature at this point, as before stated, should be approximately 65° C., a suitable thermometer 30 being placed there to indicate the temperature.

The operation of the process will to a certain extent be clear from the preceding description of the apparatus, but it is desired to state that either of two methods of operating the apparatus may be used. Assuming the steam pressure in the heater to be held constant, the amount of reflux back to the column 5 may be held constant, as, for example, at a ratio of 3 parts returned to 1 part drawn off, and the feed may then be regulated in such a manner as to maintain the proper temperature at the top plate of the column, this feed regulation being accomplished by operating a valve 31 in the alcohol feed pipe, the operator being guided by the reading of the thermometer 30 in adjusting the valve. The valve 31 will be so operated as to maintain the ternary constant boiling composition on the top plate of the column. Since substantially all of the benzol originally admitted is continually recovered and returned to the distilling column 5, there will be no occasion to admit further benzol from the tank 2 except to replace losses, and when doing this the benzol is admitted until the proper temperature is indicated by the thermometer at the side of the column. The regulation of the admission of alcohol fixes the ratio of benzol to water in the mixture entering the column through the pipe 4, since the water is of course obtained from the incoming alcohol. It has been found that this ratio of benzol to water may be approximately 17:1. However, this ratio will diminish and reach a ratio of about 10:1, or, in practice, any ratio from 10.5:1 to 9.5:1, as an approximate lower limit, when the column is operating with nearly the exact constant boiling ternary mixture on the top plate.

The second method of regulating the process is to hold the feed constant and regulate the reflux by means of the valve 12 in such a manner as to maintain the required temperature on the top plate of the column 5. This method of regulation need not be further described, as it would be analogous to the first-mentioned method of regulation.

An advantage of the process just described is the close regulation which may be obtained and the resulting purity of the product. The uniform manner in which the process may be conducted requires less labor and also has the advantage of consuming a minimum amount of benzol. It will be understood that in this process benzol may be replaced partly or wholly, by equivalent liquids, such, for example, as the petroleum hydrocarbons, ethyl acetate, chlorinated hydrocarbons or any dehydrator which is not miscible with water and which will form a constant boiling ternary mixture with alcohol and water in such a manner as to remove the water from the alcohol.

As many apparently widely different embodiments of this invention may be made without departing from the spirit thereof, it is to be understood that I do not intend to limit myself to any specific embodiment thereof, except as indicated in the appended claims.

I claim:

1. In the manufacture of absolute ethyl alcohol by fractional distillation of a mixture of alcohol, water and low boiling hydrocarbon in a column still, the process which comprises supplying said still with a mixture of the three substances wherein the ratio of the low boiling hydrocarbon to water is between a point above 10.5:1 and 17:1.

2. In the manufacture of absolute ethyl alcohol by fractional distillation of a mixture of alcohol, water and benzol in a column still, the process which comprises supplying said still with a mixture of the three substances wherein the ratio of the benzol to water is between a point above 10.5:1 and 17:1.

3. In the manufacture of absolute ethyl alcohol by fractional distillation of a mixture of alcohol, water and low boiling hydrocarbon in a column still, the process which comprises supplying said still with a mixture of the three substances which is made outside of the column wherein the ratio of the low boiling hydrocarbon to water is between a point above 10.5:1 and 17:1.

4. In the manufacture of absolute ethyl alcohol by fractional distillation of a mixture of alcohol, water and benzol in a column still, the process which comprises supplying said still with a mixture of the three substances which is made outside of the column wherein the ratio of the benzol to water is between a point above 10.5:1 and 17:1.

5. In the manufacture of absolute ethyl alcohol by fractional distillation of a mixture of alcohol, water and low boiling hydrocarbon in a column still, the process which comprises supplying said still with a mixture of the three substances wherein the ratio of the low boiling hydrocarbon to water is between a point above 10.5:1 and 17:1, and refluxing to the said still a portion of the ultimate condensate obtained therefrom.

6. In the manufacture of absolute ethyl alcohol by fractional distillation of a mixture of alcohol, water and benzol in a column still, the process which comprises supplying said still with a mixture of the three substances wherein the ratio of the benzol to water is between a point above 10.5:1 and 17:1, and refluxing to the said still a portion of the ultimate condensate obtained therefrom.

7. In the manufacture of absolute ethyl alcohol by fractional distillation of a mixture of alcohol water and low boiling hydrocarbon in a column still, the process which comprises supplying said still with a mixture of the three substances which is made outside of the column wherein the ratio of the low boiling hydrocarbon to water is between a point above 10.5:1 and 17:1, and reflexing to the said still a portion of the ultimate condensate obtained therefrom.

8. In the manufacture of absolute ethyl alcohol by fractional distillation of a mixture of alcohol, water and benzol in a column still, the process which comprises supplying said still with a mixture of the three substances which is made outside of the column wherein the ratio of the benzol to water is between a point above 10.5:1 and 17:1, and refluxing to the said still a portion of the ultimate condensate obtained therefrom.

In testimony that I claim the foregoing, I have hereunto set my hand this 6 day of November, 1924.

ELWOOD I. CLAPP.